United States Patent [19]

Stoy et al.

[11] 4,021,382

[45] May 3, 1977

[54] METHOD FOR THE PREPARATION OF HYDROPHILIC SPONGY GELS

[75] Inventors: Artur Stoy; Vladimir Stoy; Miroslav Stol, all of Prague, Czechoslovakia

[73] Assignee: Ceskoslovenska akademie ved, Prague, Czechoslovakia

[22] Filed: Jan. 21, 1974

[21] Appl. No.: 434,944

[30] Foreign Application Priority Data

Feb. 15, 1973 Czechoslovakia ............... 1098-73

[52] U.S. Cl. .................................. 260/2.5 M; 3/1; 3/13; 32/10 R; 55/528; 128/260; 128/334 R; 128/349 R; 131/202; 131/207; 138/DIG. 7; 138/DIG. 9; 138/103

[51] Int. Cl.$^2$ .................. C08J 5/22; C08J 9/02

[58] Field of Search .... 260/2.5 M, 2.5 R, 29.6 AN, 260/29.6 AQ; 526/23, 52

[56] References Cited

UNITED STATES PATENTS

| 3,375,208 | 3/1968 | Duddy | 260/2.5 M |
|---|---|---|---|
| 3,408,315 | 10/1968 | Paine | 260/2.5 M |
| 3,475,355 | 10/1969 | Decker | 260/2.5 M |
| 3,476,844 | 11/1969 | Villain | 260/2.5 M |
| 3,576,686 | 4/1971 | Schmidle et al. | 260/2.5 M |
| 3,577,359 | 5/1971 | Carevic et al. | 260/2.5 M |
| 3,709,842 | 1/1973 | Stoy | 260/2.5 R |
| 3,749,685 | 7/1973 | Johnson et al. | 260/2.5 M |
| 3,798,188 | 3/1974 | Takizawa et al. | 260/2.5 R |
| 3,816,575 | 6/1974 | Susuki et al. | 260/2.5 M |
| 3,897,382 | 7/1975 | Stoy et al. | 260/29.6 AN |

*Primary Examiner*—Murray Tillman
*Assistant Examiner*—Thurman K. Page

[57] ABSTRACT

A method for the preparation of a hydrophilic acrylonitrile-containing polymer comprising admixing a solution of said polymer in 47% to 75%, preferably 50 to 72% concentrated $HNO_3$, with solid particles of a substance insoluble in said acid solution and soluble in water, aqueous solutions of said substance being operative to precipitate said polymer from said $HNO_3$, shaping the mixture of the dissolved polymer with said solid substance to a desired physical shape, coagulating said shaped polymer in an aqueous medium and washing said solid particles out from the coagulated polymer, and articles made therefrom.

The added solid substance either may react with nitric acid forming a water-soluble nitrate, or it may remain in the mixture unchanged.

16 Claims, No Drawings

METHOD FOR THE PREPARATION OF HYDROPHILIC SPONGY GELS

BACKGROUND OF THE INVENTION

This invention relates to a method for the preparation of hydrophilic spongy gel-like materials. The invention relates more particularly to the production of spongy hydrophilic acrylonitrile-containing polymers and to articles produced therefrom.

Hydrophilic spongy gels are heretofore made, have been prepared by copolymerization of hydroxyethyl methacrylates with a minor amount of a glycol dimethacrylate in the presence of more than 40% by weight of water. An excess of water separates in the course of the polymerization forming tiny droplets, which droplets communicate with each other if the polymerization is carried out in the presence of 70% or more of water such that a true sponge-like substance having open pores is formed. The pores formed in this way, however, are too small for many purposes, for example where the spongy gel is to be used as an implantation material in medicine. In that case, a newly growing tissue needs enough room in the channels to be nutrified properly, or otherwise it withers away and calcifies. It is for the foregoing reason that there was made an attempt to enlarge the pores by the known method used in the production of viscous sponge materials, i.e., admixing into the polymerization mixture properly sized crystals which are soluble in water but insoluble in the polymerizing mixture, so that they can be washed from the product after the polymerization has been finished.

The above-mentioned methods and products thus formed, notwithstanding, have many failings which cannot be easily eliminated. First, the hydrophilic glycol methacrylate sponge has a low mechanical strength such being, especially sponges having large pores and/or considerable porosity. Second, the swelling capacity of the glycolmethacrylate polymer is limited (about 40% by weight of water). Third, articles produced from the spongy hydrogel have to be shaped by polymerization casting, i.e., the threedimensional network of the polymer is formed by polymerizing the water-diluted monomer mixture in a proper mold. Fourth, the polymerization is very sensitive to the presence of traces of oxygen and other impurities acting as inhibitors of free-radical polymerization. Fifth, residues of the initiators, etc. (some being soluble in water but only slightly) have to be washed out thoroughly after the polymerization has been finished, and this accordingly requires a long and multi-step washing with water or costly washings with ethyl alcohol. It is known that there are stronger hydrogels than the polyglycolmethacrylate ones referred to above. There are, for example, copolymers of acrylonitrile obtained either by a partial hydrolysis of polyacrylonitrile or by copolymerizing acrylonitrile with a hydrophilic co-monomer(s). A spongy structure cannot be obtained in this case by phase-separation during the polymerization inasmuch as, if the acrylonitrile is polymerized or copolymerized in the presence of a precipitation agent, a so-called macroporous polymer having much smaller pores than those of the spongy one is formed in only the base case. If, on the other hand, a considerable amount of the precipitation agent is present during the polymerization, there is formed a heterogeneous structure consisting essentially of single-non-cohering polymer or copolymer particles. The polymer thus formed is easily crumbled as it does not possess the desirable strength and flexibility. Namely, the solid phase separates out during the polymerization instead of the liquid phase separation observed in the abovementioned case of glycol methacrylate polymerization.

It is an object of the instant invention to provide for a method of preparing spongy hydrophilic acrylonitrile-containing polymers.

It is another object of the invention to avoid one or more drawbacks of the prior art.

Other objects and advantages will become more apparent from the detailed description and claims which follow hereinafter.

SUMMARY OF THE INVENTION

Broadly speaking, the invention includes the provision of a method for the preparation of a hydrophilic acrylonitrile-containing polymer comprising admixing a solution of said polymer in 47% to 75% preferably 50% to 72% concentrated $HNO_3$ with solid particles of a substance insoluble in said acid solution and soluble in water, aqueous solutions of said substance being operative to precipitate said polymer from said $NHO_3$, shaping the obtained mixture to a desired physical shape, coagulating said shaped polymer in an aqueous medium and washing said solid substance out of said coagulated polymer. The term "substance" means here not only the originally added solid compound, but also its reaction product with nitric acid, e.g. where urea or a salt of a weak acid was added resulting in a water soluble nitrate, insoluble in nitric acid. The materials produced by the instant process find uses in many fields where acrylonitrile-containing polymers of a spongy hydrophilic nature are employed, most notably as medical implants, prostheses, physiologically acceptable conduits, drug containing implants, and the like.

DETAILED DESCRIPTION

It has now been found that in a preferred embodiment spongy hydrogels having excellent properties can be prepared by mixing solutions of acrylonitrile-containing hydrophilic polymers, such as those of acrylonitrile with acrylamide, acrylic and/or methacrylic acid and the like and additionally with a minor amount of other co-monomers where desired, dissolved in about 50% to about 72% nitric acid, with solid particles, advantageously crystals or grains of substances which are essentially insoluble in the said polymer solution, but readily soluble in water thereby providing solutions precipitating said polymer, whereupon the whole mixture can then be shaped, coagulated with water or an aqueous solution and thereafter washed with water until said solid substance is entirely removed therefrom.

The solution of the polymer in nitric acid can be prepared in many ways. For instance, the polymer can be prepared by the known precipitation polymerization in water, the precipitated polymer being filtered off, washed with water, dried and subsequently dissolved in nitric acid.

Another method consists in dissolving polyacrylonitrile or a copolymer of acrylonitrile with a minor amount of an acrylamide in nitric acid and subjecting the polymer or copolymer to hydrolysis catalyzed by nitric acid. Of course, it is also possible to dissolve the polymer in cooled sulfuric acid and to precipitate the copolymer with water after the desired degree of hydrolysis has been achieved. The precipitate is washed with water, dried and then subsequently dissolved in cold nitric acid.

The most convenient method, however, consists in polymerizing or copolymerizing acrylonitrile directly in nitric acid of the above noted concentration range, and, if a sufficient amount of a hydrophilic monomer (such as acrylamide, acrylic or methacrylic acid) has not been added to the starting mixture, subjecting the polymer or copolymer to controlled partial hydrolysis, advantageously at a temperature below 18° C.

It is to be understood that the particular method employed in forming the acrylonitrile-containing polymer utilized in the instant process does not form an essential part of the invention.

The ratio of acrylonitrile to comonomer(s), where employed, is substantially non-critical and may vary from 20% to 80%, preferably 30 to 70%. It is to be understood that the polymer may be polyacrylonitrile. In addition to acrylic and methacrylic acid, and acrylamide, one may also use as comonomers, such other reactive compounds as methacrylonitrile, vinyl carbazole, alkali ethylene sulfonates, i.e., Na and K ethylene sulfonate, and the like.

While most water-soluble substances can be employed as heretofore in the process known for providing sponges of various polymers, e.g., polyglycol methacrylate or viscose polymeric materials, only some water-soluble substances meet the conditions necessary in the case as defined above. For instance, it has been found that sodium nitrate can be used with the desired result, while potassium nitrate and ammonium nitrate cannot be used. Similarly, sodium sulfate can be used, but not magnesium sulfate. These unsuitable compounds do not yield a spongy structure after coagulating the composition with water. Such compositions are, even if the copolymer is coagulated with water, very sticky so that it is not possible to separate them from molds (even where the molds are made of polytetrafluoroethylene) without serious damage. The messy compositions thus formed cannot be shaped, even if they are coagulated, they only form shapeless, more or less entire, non-porous gels.

The suitable substances, such as the sodium salts referred to, when employed, are included in amount of 10 to 90%, preferably 20 to 60% by weight. These may be employed alone or together with other water soluble compounds more particularly referred to hereinafter.

If a substance reacting with nitric acid to yield nitrates is added, the hydrophilic polymer is concentrated and partly coagulated on the surface of the solid particles. The reaction proceeds slowly so that shaping is possible after a homogeneous mixture has been prepared.

On the other hand, in accordance with this invention, with water-soluble substances insoluble in the polymer-nitric acid solutions permit the attainment of readily shapeable compositions, which coagulate with water or aqueous solutions (e.g. with water-ethanol mixtures) very quickly before the solid substance (or at least its essential part) has been extracted out of the product. Another condition to be met, i.e., the coagulation has to preceed the extraction in order that permanent cavities are formed. That is why it is preferred to carry out the coagulation with an aqueous solution (or an ethanolic solution because alcohol does not dissolve to any extent most of the water soluble compounds useful in the process) in the first step, whereupon the solid crystalline or granular substance is extracted with water in the second step.

It is therefore advantageous in some cases in carrying out the process to add a solid material having a slightly basic nature (e.g., urea) and which yields nitrates insoluble in the copolymer solution, but soluble in the coagulation bath. Such a composition which solidifies after a short time (similarly to a mixture of calcined plaster with water) can be extracted after the desired shaping process without the hazard of an undesirable change of shape (i.e., the shaped article can be washed after removing it from the mold). It thereby allows one to carry out the production with a small number of molds.

In accordance with the above embodiment, one employs such nitrogen containing compounds or urea-containing compounds as urea, urea mononitrate, guanidine nitrate, guanidine acetate, thiourea, melamine, and the like. Also operative are compounds such as pyridine, aniline, nitraniline and their salts. In case of strongly basic substances such as guanidine or semicarbazide, it is preferred to use their salts with acids, to avoid increasing of temperature due to high neutralization heat. Urea seems to be best appropriate, being simultaneously very cheap. The compounds therefore may also conveniently be classed as slightly basic nitrate yielding compounds. They are employed, where desired, in amounts of about 10 to 90%, preferably 20 to 60%, based on the weight of the total mixture.

All of said insoluble solids, if admixed in a considerable amount, act as a thickening agent. Moreover, they decrease substantially the tackiness of the composition so that it can be easily treated using molds or shaping tools made of polytetrafluoroethylene, polyethylene, polypropylene, polyvinyl chloride, various copolymers resistant to nitric acid, and stainless steel and the like.

If urea or urea mononitrate is used as the (transient) filler, the mold can be made of less refined steel or even of aluminum, because urea mononitrate is operative to decrease the corrosiveness of nitric acid.

The solidification of the thus produced composition after addition of the basic filler is akin to coagulation; in fact, an essential part of the solvent (i.e., nitric acid) is converted into the solid nitrate, so that concentrations of the solid and the dissolved copolymer in the solution increase simultaneously. The rubber-like visco-elastic solution thus formed acts as a flexible binder of the urea and urea mononitrate crystals. It is for this reason that the composition is shapeable by applying suitably high forces even if it is already solidified. Of course, the solidified composition is not as fluid as before the solidification, but it is still able to reproduce details of the mold.

In carrying out the process as above defined, the $HNO_3$ may have a concentration that varies from about 47 to 75%, although, as aforesaid about a 50 to 72% concentrated solution is preferred.

The procedures referred to above are generally carried out at temperatues of about 0 to 50° C, the temperatures of about below 75° C are also as well operative, the preferred range being about 10° to 30° C.

The time required for the above procedure is substantially noncritical, it is, of course, dependent upon the temperature employed and the variables of the reactants.

It is preferable that the basic material be added to the nitric acid polymer mix in the solid form, preferably in the crystal or granular state having principally about a 200 to 500 micron size. As aforesaid, these basic substances are operative to bring about precipitation of the acrylonitrile-containing polymer in nitric acid whereafter the same then being shaped, coagulated and preferably washed to remove water soluble particles therefrom. The basic materials are soluble in water, but not in $HNO_3$ and are therefore operative to precipitate the polymer from the acid solution.

The hydrophilic spongy copolymers can be also advantageously converted into three-dimensional insoluble gels by a subsequent crosslinking, e.g., with formaldehyde, diepoxide, dimethylol urea etc. The copolymers containing a substantial amount of carboxylic groups, which can be formed either by an additional acidic or basic hydrolysis at a higher temperature, or by the above mentioned reaction with nitrous acid, can be readily crosslinked with multivalent ions of those metals, which carboxylates are but only slightly dissociated (e.g. trivalent cations of chronium, aluminum or iron). Of course, such an ionic crosslinking is stable only in acidic or neutral medium.

If desired, the crosslinking can be carried out just on the surface to provide abrasion resistance and strength to the articles.

In order to more fully appreciate the above process and the invention, the following examples are offered. It is to be understood that the examples are only for the purpose of illustration and are not to be considered as limiting the scope thereof. All parts, proportions, and ratios given therein as well as in the appended claims are by weight unless otherside indicated.

EXAMPLE 1

198 ml of acrylonitrile, 2 ml of methacrylonitrile and 0.4 g of acrylamide are dissolved in 600 ml of nitric acid (density at 20° C, 1.40), solution of 1.1 g of urea in 2 ml of water and 3 ml of 5% aqueous solution of ammonium peroxodisulfate are added, and the solution is stored 70 hours at 20° C and then 240 hours at +10° C.

20 g of the the viscous solution of block copolymer of acrylonitrile and acrylamide thus obtained is mixed with 18 g of crystalline urea mononitrate (size of the crystals within the range of 200 to 500 microns). The composition is shaped in 1.5 mm gap between concave matrix and convex patrix - both parts of the mold are made of polytetrafluoroethylene - providing a spherical cap, having an inner radius of 15 mm and a sagital depth of 32 mm, with a thickened edge. The patrix is removed and the matrix with the cap are immersed into cold water for 15 minutes, whereafter the article is taken out of the matrix and washed in luke warm water until all of the urea mononitrate is extracted. The article is then sterilized by boiling it in physiological solution. It is designed for covering a denuded surface of a joint to prevent its concrescence, and to support new gristle tissue growing through the pores of the cap.

EXAMPLE 2

250 g of the solution of the copolymer prepared according to Example 1 are mixed with 200 g of crystalline sodium nitrate and the mixture is cast into a mold of a mammary prosthesis (the mold is made of polyvinylchloride). The filled mold is put into warm water until the mammary prosthesis can be easily removed, whereupon the washing is carried out by repeating squeezing. The washed prosthesis is put into a physiological solution and sterilized by boiling. It is many times stronger and more flexible than similar ones made from polyglycol methacrylate crosslinked with 1% of glycol dimethacrylate. The compatibility of both prostheses with a living tissue is approximately the same.

EXAMPLE 3

190 ml of acrylonitrile are dissolved in 606 ml of nitric acid having a density of 1.400, a solution of 1 g of urea in 2 of water is added together with 4 drops of 10% aqueous solution of silver nitrate and 4 ml of 5% aqueous solution of ammonium peroxodisulfate. The solution thus formed is covered with a 10 mm thick layer of white oil, and stored for 3 days at 22° C and a further 7 days at +10° C, whereupon the solution of the block copolymer of acrylonitrile with acrylamide is heated to ambient temperature and quickly and thoroughly mixed with the same volume of granulated urea (grain size 1 mm). The mixture is pressmolded into the shape of the mammary prosthesis, after some two minutes taken out of the mold, and its surface is coated with the starting copolymer solution, whereupon it is washed with water to remove the urea and any nitrate. The prosthesis thus obtained has much larger, but less numerous pores than that of the Example 2. The nonporous surface layer prevents the growing of the living tissue into the bulk of the prosthesis.

EXAMPLE 4

The solution according to the Example 3 is quickly mixed with the same volume of crystalline urea, the composition is then calendered between two polyvinylchloride rollers (their smooth surface is lubricated with silicone oil), so that a 0.5 mm thick sheet is obtained. The elastic spongy plate obtained by washing the above mentioned sheet with water at temperature from 20° to 40° C is cut into pieces of a proper size which are sterilized and soaked with an aqueous solution of an antibiotic having a broad spectrum (e.g. Rifampicine or Ampicilline - trade marks), and where desired other drugs (e.g. the hydrazide of isonicotinic acid). Then the spongy particles are dipped into the copolymer solution of the same type as described in Example 3 (the only difference is that the solution is stored just 12 days at 10° C, then extruded into water, and the precipitate is dissolved in dimethyl sulfoxide at 70° C to form a viscous 7% solution). The particles are then put into sterile distilled water. The thin hydrogel layer on the surface of the particles permits controlled diffusion of the incorporated drug. The dimethyl sulfoxide is washed out, the particles are put into physiological solution with 0.0001% of Rivanole, whereupon they are sealed in sterile polypropylene capsules. The particles are useful as temporary implants in the vicinity of an inflammantion.

There can also be prepared implants containing cancerostatic, cytostatic or various combination of other drugs in the same way.

The spongy particles of the above described type may be also dried, sterilized by ethylene oxide or by ionizing irradiation, and applied in the dry state. They swell after their implantation into an organism, and the drug begins to penetrate into the vicinity by diffusion. The diffusion rate may be controlled either by the degree of hydrolysis of the polymer in the surface hydrogel layer, (the higher degree, the higher rate of the diffusion), or by thickness of the hydrogel layer.

EXAMPLE 5

The copolymer solution is prepared in the same way as described in Example 1, but is stored for 190 hours at 10° C, so that degree of hydrolysis is lower. 200 g of this solution are mixed with 200 g of crystalline urea mononitrate having a grain size of 200 to 500 microns. The composition is shaped between two smooth polyvinylchloride plates to form a block 10 mm thick, which is subsequently thoroughly washed with water, sterilized and put into physiological solution. The shaping of the block may be carried out by cutting, trimming, sheering, etc., as described. There is obtained a very useful alloplastic surgical material in any shape desirable according to the required situation, especially in osseous surgery (arthrosis, etc.). Missing parts of a bone (if the defect is not too large, e.g. at complicated fractures) are rebuilt in about six weeks after the alloplastic graft of the material according to the invention has been implanted. The originally porous material is by this time incorporated into the surrounding osseous tissue, and the newly grown bone has its supporting function restored without complications, about which surgeons often complain where a natural graft is used (e.g., its absorption or its ulceration.).

Another example of the medical use of the spongy copolymer according to this invention is in the construction of the alveolar crest of a jaw which has atrophied due to the extraction of teeth as for instance an old person. The spongy inset implanted into the gums permits the heightening of the alveolar crest, so that it is possible to apply a denture prothesis about six weeks after implantation.

Similarly, conical insets can be used for filling depressions remaining after tooth roots have been extracted so that neighboring sound teeth hold in the jaw much better than if the depressions or cavities are left empty.

EXAMPLE 6

A mixture of the copolymer solution with the crystals of urea mononitrate according to Example 1 is extruded through a nozzle having a diameter 2 mm by means of a stainless steel piston, forming sticks 25 cm long. The sticks are coated with a thin layer of the homogeneous copolymer (the coating is carried out by dipping them into the copolymer solution, by brushing, spraying, etc. and the subsequent coagulation of the copolymer conducted with cold water), the laminated sticks are then washed thoroughly with water, sterilized by boiling in water and put into sterile physiological solution. Both ends of each stick are cut off to expose the porous core, and the sticks are used for draining superfluous cerebro-spinal fluid from the intracranium into the vena cava of patients suffering from hydrocephalis (the drains are implanted subcutaneously).

EXAMPLE 7

A finely porous sponge prepared as described in Example 2 is cut into pieces and pressed into a glass tube having an inner diameter of 1.5 cm and a bottom made of fritted glass. The stuffed tube is used as a chromatographic column having hydrophilic properties. It could be also used as an absorber of ions of heavy metals.

EXAMPLE 8

Discs made of the spongy material prepared according to Example 1 are dried and used as a filter for entrapping traces of moisture (i.e. micro-droplets of water) from liquid fuels. The filter is to be placed on the bottom of a tank of an engine (especially automobile or aircraft one). It prevents the clogging up the delivery tubes and fuel nozzles with ice and the like where the engine operates at low temperature.

EXAMPLE 9

One part of the copolymer solution prepared according to Example 3 is mixed with two parts of crystalline anhydrous sodium sulfate. The composition is extruded through a circular nozzle into a coagulation bath consisting of 50% of water and 50% of ethyl alcohol, and the copolymer quickly coagulated without the salt being extracted. The cord formed of the coagulated composition is cut into short cylinders, which are washed with water until the salt is entirely removed. The dry cylinders are used as cigarette and pipe filters entrapping the tar products of tobacco. Similar filters of a larger size are useful for trapping aerosols from air.

EXAMPLE 10

190 ml of acrylonitrile, 2 g of vinyl carbazole and 1 g of acrylamide are dissolved in 605 g of 65% nitric acid, and 1 g of urea, dissolved in 2 ml of water, and 1.8 ml of 10% aqueous solution of potassium peroxodisulfate are added therein. The solution is stored for 4 days at 21° C and for 9 days at +10° C, whereupon it is thoroughly mixed with 1 kg of finely crystalline urea mononitrate having a grain size of less than about 30 microns. The composition is shaped by pouring it from a glass plate into a stream of water at 13°–15° C. The sheet thus formed is washed with water at 40° C until the urea mononitrate is removed, which takes about 2 hours. The sheet is then cut into thin strips, which are put into a glass column, whereupon they are washed with a dilute aqueous solution of nitrous acid and anhydrochloric acid, and the generated gases removed from the head of the column. The column can be used (directly or after further chemical treatment) for sorption of ions or biologically active substances, or as a catalyst for chemical reactions at temperature not exceeding 100° C.

The sorbent can be further treated e.g., by complexing it with silver, copper, palladium or gold, and, if need be, by reducing the metals to form colloid particles having a large active surface. It is also possible to convert the carboxylic groups into hydroxamic ones, or into

by reaction of their sodium salt with chlorides of phosphorus or with thionyl chloride, and acyl chloride groups can be further changed into

groups by reaction with sodium sulfide, or into

by acidifying them, respectively. The last group can be further converted into mercaptan groups by reducing them with hydrides, etc. As a result, the spongy copolymer according to the invention is a useful material for various chemical transformations yielding miscellaneous reactive groups. It allows one to prepare selective or non-selective sorbents of various compounds.

EXAMPLE 11

3 mols of acrylonitrile, 2 mols of sodium ethylene sulfonate and 1 mol of acrylamide are copolymerized in aqueous solution at pH 2. The polymerization is initiated with a redox-system consisting of ammonium peroxodisulfate, sodium pyrosulfite and a ferrous salt. The copolymer precipitates during the polymerization and is filtered off, washed with water, partially dried and dissolved in 65% nitric acid. The 8% copolymer solution thus formed (its viscosity depends on degree of the polymerization i.e., on the amount of the initiator added) is quickly mixed with half of its volume of crude crystalline urea (average size of the crystals was 0.3 mm, maximum size, 1 mm). The composition is shaped, coagulated with water and washed as described above. The sponge thus obtained is transferred into the hydrogen cycle by acidifying, 0.1% of formaldehyde is added, and the mixture is heated 2 hours at 80° C, washed, and used as a sorbent in absorption column.

EXAMPLE 12

Polyacrylonitrile having an average degree of polymerization of 1500 is prepared by the conventional precipitation polymerization in water. The polymer thus obtained is washed with warm water and dried in vacuo at 40° C. 10 parts of the powder-like polymer, 0.1 part of urea (i.e., an oxidation stabilizer) are gradually added into 100 parts of 70% nitric acid at −40° C, whereupon temperature of the dispersion is slowly raised to ambient. The viscous solution thus formed is stirred for 3 hours at 45° C, whereupon it is thoroughly mixed with 80 parts of crystalline disodium hydrogen phosphate (dodecahydrate).

The composition is extruded through a polytetrafluoroethylene nozzle (having a diameter 10 mm) into an excess of water having a temperature of 15° to 20° C. The salt is then washed out with warm water, the spongy rope put into 10% aqueous glycerol solution for two hours, whereupon it is partially dried, and cut into short pieces which are useful as cigarette filters for a sorption column.

The term spongy hydrophilic polymer is meant to include porous materials with various porosities and various pore size, with pores at least partly open and mutually connected so that the liquid contained therein may be at least partly squeezed off; the term "hydrophilic polymer" means a polymer swellable in water and in diluted aqueous solutions but insoluble therein.

The term "polymer" is meant to include copolymers.

We claim:

1. A method for the preparation of a spongy hydrophilic acrylonitrile-containing polymer comprising the steps of forming a solution of a polymer containing acrylonitrile in nitric acid having between 47 to 75% concentration with said polymer solution, admixing with said solution 10 to 90% by weight of a thickening agent comprising solid particles of a substance which is (a) insoluble in said acid solution (b) soluble in water, and (c) being operative in aqueous solutions or its nitrate respectively to precipitate said polymer from said nitric acid, shaping the mixture of said polymer solution and solid particles to a desired physical shape, subsequently coagulating said shaped polymer in an aqueous medium, and thereafter washing said solid particles out of the coagulated polymer.

2. A method as defined in claim 1 wherein said polymer is a partly hydrolyzed polyacrylonitrile.

3. A method as defined in claim 1 wherein said polymer is a copolymer of acrylonitrile and at least one member selected from the group consisting of acrylamide, acrylic and methacrylic acid, vinyl carbazole, alkali metal ethylene sulfonate, methacrylamide, and methacrylonitrile.

4. A method as defined in claim 3 wherein the ratio of acrylonitrile to said group member is 20 − 80 : 80 − 20.

5. A method as defined in claim 1 wherein said solid particles are selected from the group consisting of sodium nitrate, sodium sulfate, urea, urea mononitrate, guanidine nitrate, guanidine acetate, thiourea, melamine and mono- and di-sodium hydrogen phosphate.

6. A method as defined in claim 1 wherein solid particles are included in amounts of about to 60% by weight.

7. A method as defined in claim 1 wherein said substance is a weakly basic nitrogen-containing compound.

8. A method as defined in claim 1 carried out at temperatures of about ambient to below about 75° C.

9. A method as defined in claim 1 wherein said acrylonitrile-containing polymer is polymerized in situ in said nitric acid which is thereafter employed in producing said spongy polymer.

10. A method as defined in claim 2 wherein said polymer is polymerized in situ in said nitric acid and thereafter left therein at a temperature below about 18° C in order to effect the partial hydrolysis thereof.

11. A method as defined in claim 1 wherein the said polymer is prepared by polymerizng acrylonitrile in about 50% to about 72% nitric acid, whereupon the polymer is kept at a temperature below about 50° C until a desired amount of the nitrile groups thereof are hydrolyzed.

12. A method as defined in claim 1 wherein said solid particles are crystals or grains of urea mononitrate or guanidine nitrate.

13. A method as defined in claim 1 wherein said solid particles principally have a size of about 200 to about 500 microns.

14. A method as defined in claim 1 wherein said solid particles are crystals or grains of urea.

15. The method as defined in claim 1 wherein said polymer is un-crosslinked.

16. A method as defined in claim 1 wherein said solid particles are selected from the group consisting of pyridine, aniline, nitroaniline and their salts.

* * * * *